United States Patent Office 3,703,577
Patented Nov. 21, 1972

3,703,577
4-(THIAZOLYL) PYRIDINIUM SALTS AND 4-(OXAZOLYL) PYRIDINIUM SALTS FOR LOWERING BLOOD GLUCOSE LEVELS
Victor John Bauer, Montvale, N.J., Gretchen Ellen Wiegand, Pearl River, N.Y., and Sidney Robert Safir, River Edge, N.J., assignors to American Cyanamid Company, Stamford, Conn.
No Drawing. Continuation-in-part of application Ser. No. 690,382, Dec. 14, 1967, which is a continuation-in-part of application Ser. No. 669,705, Sept. 22, 1967, both now abandoned. This application Mar. 22, 1971, Ser. No. 127,023
Int. Cl. A61k 27/00
U.S. Cl. 424—263                                    5 Claims

ABSTRACT OF THE DISCLOSURE

Compositions containing thiazolylpyridinium salts and oxazolylpyridinium salts are described. The use of these compositions as a means for the lowering of blood glucose levels in warm-blooded animals is described.

---

This application is a continuation-in-part of our application Ser. No. 690,382, filed Dec. 14, 1967 now abandoned which is a continuation-in-part of application Ser. No. 669,705, filed Sept. 22, 1967, now abandoned.

The new compositions of the present invention contain as the active component compounds of the following formula:

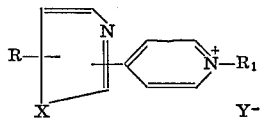

R is selected from the group consisting of hydrogen, methyl and cyclopropyl; $R_1$ is selected from the group consisting of alkenyl ($C_3$–$C_4$), alkyl ($C_1$–$C_4$) and ethoxyethyl; X is a sulfur or an oxygen atom, and Y is a pharmaceutically acceptable anion such as, for example, chloride, bromide, iodide, and the like.

In general, the active components are crystalline solids, soluble in water.

The active components of the present invention may be prepared by reaction of a thiazolylpyridine or an oxazolylpyridine with an alkenyl ($C_3$–$C_4$), alkyl ($C_1$–$C_4$) or ethoxyethyl halide at a temperature of 0 to 15° C. with or without a solvent, such as an alcohol, for a period of time of several minutes to twenty-four hours in an open vessel or a sealed bomb. The time necessary to complete the reaction is dependent upon the temperature and other conditions of the reaction. This reaction can be illustrated schematically by the following equation:

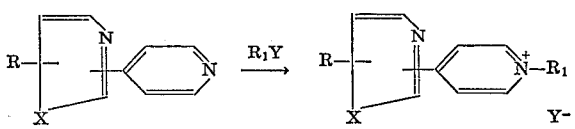

wherein R, $R_1$, X and Y are as described hereinbefore.
Among the compounds of the present invention are, for example:

1-methyl-(4-methyl-2-thiazolyl)pyridinium iodide;
1-allyl-4-(4-methyl-2-thiazolyl)pyridinium chloride;
1-methylallyl-4-(4-cyclopropyl-2-thiazolyl)pyridinium bromide;
1-ethyl-4-(2-methyl-4-thiazolyl)pyridinium iodide;
1-methyl-4-(2-oxazolyl)pyridinium iodide;
1-(2-ethoxyethyl)-4-(4-methyl-2-oxazolyl)pyridinium bromide;
1-(2-butene-1-yl)-4-(5-oxazolyl)pyridinium chloride.

The compositions of the present invention show the ability to lower blood glucose in warm-blooded animals. When the compositions are administered orally to normal mice or alloxanized mice, a reduction of blood sugar levels is observed. The active components of this invention are administered by gavage as saline solutions or aqueous carboxymethyl-cellulose suspensions to CF–1 mice (Carworth Farms, 18–25 grams, 4–6 animals). Control animals receive an equivalent volume of vehicle. Food is withheld from animals after dosing. Blood glucose is determined in 0.05 milliliter samples of blood by the method of Hoffman [J. Biol. Chem., 120, 51 (1937)] as adapted to the Technicon AutoAnalyzer® and is expressed as percent change from predose values. The data are shown in the table hereinafter.

TABLE I.—DECREASE IN BLOOD GLUCOSE IN NORMAL MICE AFTER ORAL ADMINISTRATION OF THIAZOLYL-PYRIDINIUM SALTS AND OXAZOLYLPYRIDINIUM SALTS

| Compound | Dose, mmoles/kg. | Hours after dosing | Percent decrease in blood glucose |
|---|---|---|---|
| 1-methyl-4-(4-methyl-2-thiazolyl)pyridinium chloride | 0.8 | 4 | 90± 2 |
| 1-methyl-4-(4-methyl-2-thiazolyl)pyridinium iodide | 0.8 | 6 | 68±16 |
| 1-ethyl-4-(4-methyl-2-thiazolyl)pyridinium bromide | 1.5 | 3 | 84± 2 |
| 1-n-propyl-4-(4-methyl-2-thiazolyl)pyridinium bromide | 1.5 | 5 | 71± 7 |
| 1-allyl-4-(4-methyl-2-thiazolyl)pyridinium chloride | 1.5 | 3 | 70±18 |
| 1-(2-ethoxyethyl)-4-(4-methyl-2-thiazolyl)pyridinium chloride | 1.5 | 3 | 84± 5 |
| 1-methyl-4-(5-methyl-2-thiazolyl)pyridinium iodide | 0.5 | 5 | 69± 4 |
| 1-methyl-4-(2-methyl-4-thiazolyl)pyridinium chloride | 1.6 | 4 | 64±12 |
| 1-ethyl-4-(2-methyl-4-thiazolyl)pyridinium bromide | 1.5 | 3 | 37± 8 |
| 1-n-propyl-4-(2-methyl-4-thiazolyl)pyridinium bromide | 1.0 | 3 | 49± 9 |
| 1-allyl-4-(2-methyl-4-thiazolyl)pyridinium chloride | 1.0 | 5 | 37± 3 |
| 1-(2-methylallyl)-4-(2-methyl-4-thiazolyl)pyridinium chloride | 1.5 | 3 | 31± 5 |
| 1-(2-ethoxyethyl)-4-(2-methyl-4-thiazolyl)pyridinium chloride | 1.5 | 3 | 53±11 |
| 1-methyl-4-(2-cyclopropyl-4-thiazolyl)pyridinium iodide | 1.0 | 3 | 64±18 |
| 1-methyl-4-(2-methyl-5-thiazolyl)pyridinium iodide | 1.0 | 5 | 33± 5 |
| 1-methyl-4-(2-oxazolyl)-pyridinium chloride | 3.0 | 3 | 65±13 |
| 1-methyl-4-(5-methyl-2-oxazolyl)pyridinium iodide | 3.0 | 3 | 83± 4 |
| 1-methyl-4-(2-methyl-5-oxazolyl)pyridinium iodide | 3.0 | 5 | 47± 7 |
| 1-ethyl-4-(2-oxazolyl)-pyridinium bromide | 3.0 | 5 | 61± 7 |
| 1-allyl-4-(2-oxazolyl)-pyridinium chloride | 3.0 | 5 | 48± 7 |

The above results show that the active components of the present invention are useful in lowering the blood glucose concentration in normal warm-blooded animals.

The ability of the present compounds to lower blood glucose in diabetic mice is measured as follows: The animals used are male CF 1–S mice which have been previously injected intravenously with alloxan monohydrate (75 mg./kg.) and blood glucose determined 7 days later. Only those animals with blood glucose levels $\geq 250$ mg./100 ml. are used. The present compounds are administered by gavage at the indicated levels as saline solutions. Control animals receive an equivalent volume of vehicle. Food is withheld from the animals after dosing. Blood glucose is determined on 0.02 ml. samples of blood by the method of Hoffman [J. Biol. Chem., 120, 51 (1937)] as adapted to the Technicon AutoAnalyzer® and expressed as mg./100 ml. The results are summarized in Table II as follows:

TABLE II.—EFFECT OF PYRIDINIUM SALTS ON BLOOD GLUCOSE OF ALLOXAN-TREATED MICE

| Treatment (No. per group) | Dose (mmol./kg.) | Blood glucose, mg./100 ml., hours after dosing— | | | |
|---|---|---|---|---|---|
| | | 0 | 2 | 4 | 6 |
| Saline (5) | | 411±22 | 375±20 | 390±7 | 307±55 |
| 1-allyl-4-(2-oxazolyl)-pyridinium chloride (7) | 3.0 | 438±16 | 349±25 | 256±47 | 216±50 |
| 1-(2-ethoxyethyl)-4-(4-methyl-2-thiazolyl)-pyridinium chloride (6) | 0.5 | 362±19 | 295±64 | 256±57 | 240±52 |
| 1-methyl-4-(2-cyclopropyl-4-thiazolyl)-pyridinium iodide (5) | 0.4 | 391±39 | 317±49 | 280±67 | 277±73 |
| 1-methyl-4-(2-methyl-4-thiazolyl)-pyridinium chloride (6) | 1.4 | 448±20 | 245±44 | 180±55 | 162±61 |

The compositions of the present invention may be used to lower blood sugar levels in warm-blooded animals at a dose of from 0.1 milligram to 100 milligrams per kilogram of body weight per day. They may be administered in dosage units of from 5 mg. to 500 mg. per dose. Obviously, the unit may be taken in multiples or divided into a smaller dose.

The active components of this invention can be used with pharmaceutically acceptable carriers in compositions such as tablets, wherein the principal active ingredient is mixed with conventional tableting ingredients such as corn starch, lactose, sucrose, sorbitol, talc, stearic acid, magnesium stearate, dicalcium phosphate, gums, and fractionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of material can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating. The term dosage form as described herein refers to physically discrete units suitable as unitary dosage for warm-blooded animal subjects, each unit containing a predetermined quantity of active material calculated to produce the desired therapeutic effect in association with the required pharmaceutical diluent, carrier or vehicle. Examples of suitable oral dosage forms in accord with this invention are tablets, capsules, pills, powder packets, granules, wafers, cachets, teaspoonfuls, dropperfuls, ampules, vials, segregated multiples of any of the foregoing and other forms as herein described.

DETAILED DESCRIPTION

The preparation of the active components of the compositions of this invention will be described in greater detail in conjunction with the following examples.

Example 1.—Preparation of 4-(4-methyl-2-thiazolyl)pyridine

A mixture of 10 g. of thioisonicotinamide and 10.8 g. of chloroacetone in 50 ml. of ethanol is refluxed for 6 hours. The reaction mixture is concentrated under reduced pressure and the residue is dissolved in water. The aqueous solution is made alkaline with sodium hydroxide solution and extracted with ether. The ether extracts are dried and concentrated to an oily residue, which on distillation at 120–125° C./2.5 mm. gives an oil. The oil solidifies on standing and is recrystallized from hexane to give colorless crystals, melting point 72–73° C.

Example 2.—Preparation of 4-(5-methyl-2-thiazolyl)pyridine

A mixture of 2 g. of α-isonicotinamidoacetone and 3 g. of phosphorus pentasulfide is heated in an oil bath at 110–140° C. until gas evolution ceases. The solid mass is heated with excess 1 N potassium hydroxide solution and the resulting mixture is extracted with chloroform. The chloroform solution is dried and concentrated to give a tan solid. Sublimation at 65° C./0.05 mm. provides yellow crystals, melting point 88° C.

Example 3.—Preparation of 4-(2-methyl-4-thiazolyl)pyridine

A mixture of 2.3 g. of thioacetamide and 4.2 g. of 4-bromoacetylpyridine hydrobromide in 350 ml. of methanol is refluxed for 0.5 hour. The reaction mixture is concentrated to give a solid residue, to which are added water and sodium hydroxide solution. The aqueous alkaline solution is extracted with chloroform. The chloroform extracts are dried and concentrated. The residue is recrystallized from cyclohexane to give pale yellow crystals, melting point 69–72.5° C.

Example 4.—Preparation of 4-(2-cyclopropyl-4-thiazolyl)pyridine

A mixture of 3 g. of cyclopropanethiocarboxamide and 4.2 g. of 4-bromoacetylpyridine hydrobromide in 250 ml. of methanol is refluxed for 1 hour. The reaction mixture is concentrated under reduced pressure to give a yellow solid. Water and sodium hydroxide solution are added to the solid residue and the resulting alkaline solution is extracted with chloroform. The chloroform extracts are dried and concentrated to give an amber oil. Evaporative distillation at 90–100° C./0.1 mm. gives the product as a colorless oil.

Example 5.—Preparation of 4-(2-methyl-5-thiazolyl)pyridine

A mixture of 1.5 g. of 4-acetylaminoacetylpyridine and 2.3 g. of phosphorus pentasulfide is heated in an oil bath at 110–140° C. until gas evolution ceases. The solid mass is heated with excess 1 N potassium hydroxide solution, and the resulting mixture is extracted with chloroform. The chloroform solution is dried and concentrated to an amber oil. The material is sublimed at 70° C./0.05 mm. to provide colorless crystals, melting point 30° C.

Example 6.—Preparation of 4-(2-oxazolyl)pyridine

A solution of 4.3 g. of N-(2,2-diethoxyethyl)isonicotinamide, 22 ml. of concentrated sulfuric acid, and 0.5 g. of phosphorus pentoxide is heated at 150° C. for 20 minutes and then poured onto 300 ml. of ice. The solution is made basic with sodium hydroxide and extracted with chloroform. The chloroform solution is dried over anhydrous magnesium sulfate and concentrated to a tan solid. Recrystallization from hexane provides colorless needles, melting point 102–103° C.

Example 7.—Preparation of 4-(5-methyl-2-oxazolyl) pyridine

A solution of 3.6 g. of α-isonicotinamidoacetone and 4.4 ml. of 85% phosphoric acid in 50 ml. of acetic anhydride is refluxed for 1.5 hours. The reaction mixture is cooled and the excess solvent is decanted leaving an oily residue. The oily residue is treated with dilute sodium hydroxide solution to give a white solid. Recrystallization from water gives colorless crystals, melting point 98.5–99.5° C.

Example 8.—Preparation of 4-(2-methyl-5-oxazolyl) pyridine

A solution of 1.8 g. of 4-(acetylaminoacetyl)pyridine in 27 ml. of acetic anhydride is treated with 2.2 ml. of 85% phosphoric acid. The solution is heated at reflux for 1 hour and is then cooled. The supernatant liquid is decanted and the tarry residue is treated with 1 N sodium hydroxide solution. The aqueous alkaline solution is extracted with chloroform. The chlorofrom extracts are dried over magnesium sulfate and concentrated to give an off-white solid. Sublimation of—

Example 9.—Preparation of 1-methyl-4-(4-methyl-2-thiazolyl)pyridinium chloride

A mixture of 10.5 g. of 4-(4-methyl-2-thiazolyl)pyridine and 10 ml. of methyl chloride is heated at 120° C. in a bomb for 18 houre. The excess methyl chloride is allowed to evaporate, and the residue is recrystallized from acetonitrile to afford yellow crystals, melting point 242–244° C., dec.

Example 10.—Preparation of 1-methyl-4-(4-methyl-2-thiazolyl)pyridinium iodide

A solution of 3.9 g. of 4-(4-methyl-2-thiazolyl)pyridine, 4 ml. of methyl iodide, and 35 ml. of methanol is heated under reflux for 3 hours. The solution is cooled, and the solid which separates is collected and recrystallized from isopropyl alcohol-water to provide yellow crystals, melting point 218° C., dec.

Example 11.—Preparation of 1-ethyl-4-(4-methyl-2-thiazolyl)pyridinium bromide

A mixture of 5.2 g. of 4-(4-methyl-2-thiazolyl)pyridine and 5 ml. of ethyl bromide is heated at 120° C. in a bomb for 18 hours. The excess ethyl bromide is removed, and the residue is recrystallized from acetonitrile to afford pale yellow crystals, melting point 197.5–198.5° C., dec.

Example 12.—Preparation of 1-n-propyl-4-(4-methyl-2-thiazolyl)pyridinium bromide A solution of 5.2 g. of 4-(4-methyl-2-thiazolyl)pyridine and 5 ml. of 1-bromopropane in 50 ml. of n-propyl alcohol is refluxed for 18 hours. The solvent is removed under reduced pressure and the residue is recrystallized from acetonitrile to afford pale yellow crystals, melting point 199–201° C., dec.

Example 13.—Preparation of 1-allyl-4-(4-methyl-2-thiazolyl)pyridinium chloride

A mixture of 5.2 g. of 4-(4-methyl-2-thiazolyl)pyridine and 5 ml. of 3-chloropropene is heated at 120° C. in a bomb for 18 hours. The excess 3-chloropropene is removed and the residue is recrystallized from acetonitrile to afford pale yellow crystals, melting point 189–190° C., dec.

Example 14.—Preparation of 1-(2-ethoxyethyl)-4-(4-methyl-2-thiazolyl)pyridinium chloride A mixture of 5.2 g. of 4-(4-methyl-2-thiazolyl)pyridine and 5 ml. of 2-chloroethyl ethyl ether is heated at 90° C. in a bomb for 18 hours. The excess 2-chloroethyl ethyl ether is evaporated and the solid residue is recrystallized from acetonitrile-ether to afford yellow crystals. Recrystallization from acetone affords pale yellow needles, melting point 89–92° C.

Example 15.—Preparation of 1-methyl-4-(5-methyl-2-thiazolyl)pyridinium iodide

A solution of 1.2 g. of 4-(5-methyl-2-thiazolyl)pyridine and 5 ml. of methyl iodide in 30 ml. of ethanol is heated under reflux for 1 hour. The reaction mixture is concentrated to dryness and the crude product is recrystallized from ethanol-ether to give yellow needles, melting point 238–239° C., dec.

Example 16.—Preparation of 1-methyl-4-(2-methyl-4-thiazolyl)pyridinium chloride

A mixture of 2.6 g. of 4-(2-methyl-4-thiazolyl)pyridine and 5 ml. of methyl chloride is heated at 120° C. in a bomb for 18 hours. The excess methyl chloride is allowed to evaporate, and the residue is recrystallized from ethanol-ether to give tan crystals, melting point 228–231° C., dec.

Example 17.—Preparation of 1-ethyl-4-(2-methyl-4-thiazolyl)pyridinium bromide

A mixture of 2.6 g. of 4-(2-methyl-4-thiazolyl)pyridine and 5 ml. of ethyl bromide is heated at 110° C. in a bomb for 18 hours. The excess ethyl bromide is allowed to evaporate, and the residue is recrystallized from acetonitrile to afford tan crystals, melting point 201–202° C., dec.

Example 18.—Preparation of 1-n-propyl-4-(2-methyl-4-thiazolyl)pyridinium bromide A mixture of 2.6 g. of 4-(2-methyl-4-thiazolyl)pyridine and 5 ml. of 1-bromopropane is heated at 110° C. in a bomb for 18 hours. The semi-solid residue is dissolved in acetonitrile. Ether is added to the acetonitrile solution to afford a sticky solid, which is recrystallized from acetone to give tan crystals, melting point 121–123° C.

Example 19.—Preparation of 1-allyl-4-(2-methyl-4-thiazolyl)pyridinium chloride

A mixture of 2.6 g. of 4-(2-methyl-4-thiazolyl)pyridine and 5 ml. of 3-chloropropene is heated at 120° C. in a bomb for 15 hours. The excess 3-chloropropene is removed under reduced pressure, and the residue is recrystallized from acetonitrile to produce pale yellow crystals, melting point 165–167° C., dec.

Example 20.—Preparation of 1-(2-methylallyl)-4-(2-methyl-4-thiazolyl)pyridinium chloride A mixture of 2.6 g. of 4-(2-methyl-4-thiazolyl)pyridine and 5 ml. of 3-chloro-2-methylpropene is heated at 110° C. in a bomb for 18 hours. The solid residue is recrystallized from acetonitrile to give a tan solid, melting point 185–186° C.

Example 21.—Preparation of 1-(2-ethoxyethyl)-4-(2-methyl-4-thiazolyl)pyridinium chloride A mixture of 2.6 g. of 4-(2-methyl-4-thiazolyl)pyridine and 5 ml. of 2-chloroethyl ethyl ether is heated at 110° C. in a bomb for 18 hours. The dark solid residue is washed with cold acetone and then recrystallized from acetone to afford pale yellow crystals, melting point 79.5–80° C.

Example 22.—Preparation of 1-methyl-4-(2-cyclopropyl-4-thiazolyl)pyridinium iodide A mixture of 4.5 g. of 4-(2-cyclopropyl-4-thiazolyl) pyridine and 10 ml. of methyl iodide in 50 ml. of ethanol is refluxed for 1.5 hours. The reaction mixture is concentrated to a smaller volume and the solid residue is collected. Recrystallization from acetonitrile gives yellow crystals, melting point 233–234° C., dec.

Example 23.—Preparation of 1-methyl-4-(2-methyl-5-thiazolyl)pyridinium iodide

A solution of 1.8 g. of 4-(2-methyl-5-thiazolyl)pyridine and 5 ml. of methyl iodide in 30 ml. of ethanol is heated under reflux for 1 hour. The reaction mixture is concentrated to dryness and the crude product is recrystallized from ethanol-ether to give yellow crystals, melting point 253–255° C., dec.

Example 24.—Preparation of 1-methyl-4-(2-oxazolyl)pyridinium chloride

A mixture of 2.1 g. of 4-(2-oxazolyl)pyridine and 10 ml. of methyl chloride is heated at 100° C. in a bomb for 4 hrs. The excess methyl chloride is allowed to escape, and the residual solid is recrystallized from isopropyl alcohol to provide tan crystals, melting point 244° C., dec.

Example 25.—Preparation of 1-methyl-4-(5-methyl-2-oxazolyl)pyridinium iodide

A solution of 1 g. of 4-(5-methyl-2-oxazolyl)pyridine and 5 ml. of methyl iodide in 20 ml. of ethanol is refluxed 1 hour, cooled and filtered to remove the product as a yellow crystalline solid. Recrystallization from ethanol-ether gives yellow crystals, melting point 212.5–214° C., dec.

Example 26.—Preparation of 1-methyl-4-(2-methyl-5-oxazolyl)pyridinium iodide

A solution of 0.7 g. of 4-(2-methyl-5-oxazolyl)pyridine and 3 ml. of methyl iodide in 20 ml. of ethanol is heated under reflux for 1 hour. The reaction mixture is cooled and the crude solid product is collected and washed with ether. Recrystallization from ethanol-ether gives yellow crystals, melting point 234–235° C., dec.

Example 27.—Preparation of 1-ethyl-4-(2-oxazolyl)pyridinium bromide

A mixture of 2 g. of 4-(2-oxazolyl)pyridine and 5 ml. of ethyl bromide is heated at 110° C. in a bomb for 4 hours. The excess ethyl bromide is allowed to evaporate and the residue is recrystallized from ethanol-ether to give off-white crystals, melting point 202–203° C., dec.

Example 28.—Preparation of 1-allyl-4-(2-oxazolyl)pyridinium chloride

A mixture of 2 g. of 4-(2-oxazolyl)pyridine and 5 ml. of 3-chloropropene is heated at 100° C. in a bomb for 4 hours. The excess 3-chloropropene is distilled, and the residue is recrystallized from ethanol-ether to give tan crystals, melting point 202–203° C., dec.

We claim:

1. The method of lowering blood glucose levels in warm-blooded animals which comprises orally administering to said animals a blood glucose lowering amount of a pyridinium salt of the formula:

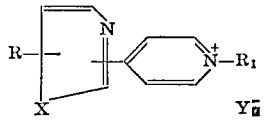

wherein R is selected from the group consisting of hydrogen, methyl and cyclopropyl; $R_1$ is selected from the group consisting of alkenyl, of 3 to 4 carbons, alkyl, of 1 to 4 carbons, and ethoxyethyl; X is selected from the group consisting of sulfur and oxygen and Y is a pharmaceutically acceptable anion.

2. The method of claim 1, in which the pyridinium salt is: 1 - methyl - 4 - (2-cyclopropyl-4-thiazolyl)pyridinium iodide.

3. The method of claim 1, in which the pyridinium salt is: 1-allyl-4-(2-oxazolyl)pyridinium chloride.

4. The method of claim 1, in which the pyridinium salt is: 1-(2-ethoxyethyl)-4-(4-methyl-2-thiazolyl)pyridinium chloride.

5. The method of claim 1, in which the pyridinium salt is: 1-methyl-4-(2-methyl - 4 - thiazolyl)pyridinium chloride.

References Cited

FOREIGN PATENTS

| 875,887 | 8/1961 | Great Britain | 424—263 |
| 1,020,805 | 2/1966 | Great Britain | 424—263 |

STANLEY J. FRIEDMAN, Primary Examiner

F. E. WADDELL, Assistant Examiner